2,830,086
PROCESS OF PREPARING ORGANIC SULFONYL HYDRAZIDES

Guido H. Stempel, Jr., Cuyahoga Falls, Ohio, assignor to The General Tire & Rubber Company, Akron, Ohio, a corporation of Ohio No Drawing. Application September 19, 1956
Serial No. 610,713

5 Claims. (Cl. 260—556)

This invention relates to improvement in the preparation of water-insoluble substituted hydrazino sulfones and, particularly, to the preparation of such compounds in purer form and with higher yields than the prior art.

This application is a continuation-in-part of my copending application, Serial No. 534,175, filed September 13, 1955, now abandoned, which is a continuation-in-part of my application, Serial No. 371,171, filed July 29, 1953, now abandoned, which is a continuation-in-part of my application, Serial No. 241,395, filed August 10, 1951, now abandoned.

These substituted hydrazino sulfones, such as benzene sulfonyl hydrazide and related compounds, are excellent blowing agents for use in making sponge rubber. They rapidly give off large amounts of gases within the necessary temperature ranges, and they are soluble in rubber. The sponge produced with such blowing agents has exceptional properties.

A serious objection to the use of substituted hydrazino sulfones as blowing agents, however, has been the high cost of such compounds when made by conventional prior art processes. The high cost of these compounds has been due in large part to the high cost of hydrazine hydrate used in their production, which constitutes a substantial part of the final products by weight, and to the fact that the hydrazine has been very inefficiently utilized in the production process.

Another problem has been the difficulty of purifying the substituted hydrazino sulfone products because of the organic nature of impurities constituting a substantial part of the crude product. Such impurities were extractable only with difficulty and at considerable expense. If left in the final product, these impurities adversely affected the rate of formation of gases when the product was used as a blowing agent.

The principal objects of the present invention are to provide a process for producing substituted hydrazino sulfones in purer form at lower cost.

More specifically, one object of the invention is to produce substituted hydrazino sulfones by a process that makes more efficient use of the expensive hydrazine by incorporating into the product a larger proportion of the amount of that reagent used in the process.

Another, more specific object of the invention, is to produce substituted hydrazino sulfones with more efficient and complete removal of impurities at the end of the process.

Other objects and advantages of the invention will become apparent to those skilled in the art from the following description and claims which form a part of this disclosure.

Organic sulfonyl hydrazides, such, for example, as benzene sulfonyl hydrazide, naphthalene-2,7-disulfonyl, hydrazide, p,p'-oxybis (benzene sulfonyl hydrazide), or p,p'-thiobis (benzene sulfonyl hydrazide), may be prepared simply by reacting hydrazine with benzene sulfonyl chloride or other appropriate organic sulfonyl chloride in an aqueous medium, for example, as described in U. S. Patent Nos. 2,552,065 and 2,626,280. However, the yields have been small for the amount of hydrazine employed even when using a considerable excess of the sulfonyl chloride, and the oil organic sulfonyl chloride employed in excess has been difficult to separate from the product by filtering and washing.

The production of organic sulfonyl hydrazides by the use of ammonia to neutralize the hydrochloric acid formed during the reaction is disclosed by N. K. Sundholm in his application, Serial No. 236,093, filed July 10, 1951, now U. S. Patent No. 2,640,853. However, the yields by this method were limited and it was not apparent to Sundholm or to ordinary persons skilled in the art how the yields could be substantially increased.

In the normal process of manufacture of organic sulfonyl hydrazides, a substantial part of the hydrazine used in the reaction mixture combines with hydrochloric acid liberated in the course of the reaction and is no longer available for reaction with the benzene sulfonyl chloride or other organic sulfonyl chloride employed. I have discovered that the hydrazine may be liberated from the hydrazine hydrochloride for reaction with the sulfonyl chloride by the use of a base substantially stronger than hydrazine without disastrous results due to the tendency of the base to react with organic sulfonyl chlorides and that best results are obtained with a strong completely ionized base rather than with weaker base such as ammonia. In accordance with the present invention, the combination of the hydrazine with the hydrochloric acid liberated in the course of the reaction is avoided by adding a strong base to the mixture at an appropriate time during the reaction to raise the pH at least to about 10 or higher and preferably by adding a sufficient amount of the base so that the mixture will remain alkaline at the end of the reaction (for example, a pH of 8 to 12). The strong base releases, in a highly efficient manner, the hydrazine which has combined with acidic materials in the mixture, such as hydrogen chloride, thereby making the released hydrazine available again for combination with the benzene sulfonyl chloride or other organic sulfonyl chloride employed. The strong base is very efficient and permits yields very close to 100% of theory and a product with a purity closely approaching 100%.

When a very strong base, such as an alkali metal hydroxide, is added as a stream to the reaction mixture containing the hydrazine hydrochloride, the hydroxide reacts readily to liberate hydrazine since in the localized area where the stream enters the mixture, the pH may be as high as 11 or 12, the overall mixture being acidic. It is impossible to obtain such a high localized pH with a weaker base, such as ammonium hydroxide, as is apparent from the graph on page 128 of "Calculations of Quantitative Chemical Analysis" (third edition), by L. F. Hamilton and S. G. Simpson (copyright 1939).

I have found that too high a pH as produced by a large excess of strong base causes solubilization and loss of the organic sulfonyl hydrazides during separation of the product, whereas very high yields are obtained with such bases when the pH at the time of separation is not in excess of 9½ (for example, a pH of 5 or 7).

I have also found that efficient removal of impurities by simple filtration and washing may be accomplished by adding a suitable surface-active agent, such as wetting or emulsifying agents, to the washing water, without reducing the amount of the insoluble benzene sulfonyl hydrazide (or other organic sulfonyl hydrazide as hereinafter set forth) recovered, provided the reaction mixture has a pH below that where solubilization occurs just prior to filtering. It is preferred for safety that at the time of filtering or separation of the organic sulfonyl hydrazide from the liquid and soluble ingredients formed or present in the reacted mixture, that the pH be on the acid side, i. e.

less than 7 (or even 5). However, it is found that appreciable solubility does not start to occur below a pH of 9½. Solubility increases as pH increases, so that while a pH of 10 provides somewhat lower yields, considerable loss occurs at pH's of 10½ and 11.

The invention is equally applicable to the production of water-insoluble substituted hydrazino sulfones other than the benzene sulfonyl hydrazide and other hydrazides discussed above, including all of those mentioned in the aforementioned Sundholm patent, namely those made from benzenesulfonyl chloride, p-toluenesulfonyl chloride, o-chlorobenzenesulfonyl chloride, m-nitrobenzenesulfonyl chloride, p-methoxybenzenesulfonyl chloride, 2-naphthalenesulfonyl chloride, 1,3-benzenedisulfonyl chloride, 1,5-naphthalenedisulfonyl chloride, 4,4'-biphenyldisulfonyl chloride, 4,4'-oxybis-(benzenesulfonyl chloride), 4,4'-thiobis-(benzenesulfonyl chloride), 2,8-dibenzofurandisulfonyl chloride, 1-butanesulfonyl chloride, cyclohexanesulfonyl chloride, 1,4-butanedisulfonyl chloride, and 2,2'-oxybis-(ethanesulfonyl chloride). The benzene radical of benzene sulfonyl hydrazide may be replaced by any substituted or unsubstituted hydrocarbon group that is not reactive with acids or bases and that is sufficiently hydrophobic for the final product to be substantially water-insoluble. Thus, any alkyl sulfonyl chloride may be employed to produce a corresponding alkyl sulfonyl hydrazide, provided only that the alkyl group contain at least four carbon atoms to give the product the desired insolubility characteristics. Similarly, any aryl sulfonyl chloride or alkyl aryl sulfonyl chloride may be employed subject to the same general limitations as to reactivity with acids and bases and as to water-insolubility. Also, the alkyl and/or aryl hydrocarbon group may carry substituents, such as nitro, nitrile, alkoxy, aryloxy, the halogens, etc. In general, any substituents are satisfactory provided the only reactive groups present (i. e. groups reactive with bases or acids) are sulfonyl chloride groups. The resulting substituted hydrocarbon sulfonyl hydrazides have very similar gas-producing characteristics when heated.

Any number of sulfonyl chloride groups may be present in the sulfonyl chloride used in forming the sulfonyl hydrazide in accordance with the present invention, providing the hydrazide compound remains water-insoluble or has at least as much hydrophobicity as a four-carbon-atom alkyl sufonyl hydrazide. The sulfonyl chloride used should also preferably have as much hydrophobicity as a four-carbon-atom sulfonyl hydrazide.

Examples of organic sulfonyl chlorides suitable for preparation of the organic sulfonyl hydrazides in accordance with the present invention are (a) the alkyl sulfonyl chlorides having at least four carbon atoms per sulfonyl chloride group present including butyl sulfonyl chloride, hexyl sulfonyl chloride, dodecyl sulfonyl chloride, mono- and di-sulfonyl chlorides and the like; (b) the aryl sulfonyl chlorides including benzene sulfonyl chloride, biphenyl mono-sulfonyl chloride, and naphthalene mono- and di-sulfonyl chlorides, such as naphthalene-1,4-disulfonyl chloride, naphthalene-2,5-disulfonyl chloride, and other naphthalene disulfonyl chlorides disclosed in the aforementioned Sundholm patent; (c) the alkoxy aryl sulfonyl chlorides including butoxy benzene sulfonyl chloride, ethoxy benzene sulfonyl chloride and the like having four or more carbon atoms per sulfonyl group present; (d) the aryloxy sulfonyl chlorides including phenoxy benzene sulfonyl chloride, p,p'-oxybis-(benzene sulfonyl chloride) and the like having at least four carbon atoms for each chloride group present; (e) the nitro aryl sulfonyl chlorides including mono- and di-nitro naphthalene sulfonyl chlorides; (f) the diaryl thioether sulfonyl chlorides including the mono- and di-sulfonyl chlorides of diphenyl thioether; (g) the alkyl aryl thioether sulfonyl chlorides including butyl thiobenzene sulfonyl chloride; (h) the haloaryl sulfonyl chlorides including the mono- to pentachloro benzene sulfonyl chlorides and including the chloro naphthalene sulfonyl chlorides having at least four carbon atoms per sulfonyl chloride group; and (i) the nitrile-substituted alkyl and aryl sulfonyl chlorides having at least four carbon atoms for each nitrile and sulfonyl chloride group present including the monosulfonyl chloride of octylnitrile and the like.

The process of the present invention is applicable to the preparation of sulfonyl hydrazides from any organic sulfonyl chloride of the general formula $R(-SO_2Cl)_n$, where $n$ is a small integer and is preferably 1 to 3, inclusive, and R is any organic radical including aryl, alkyl, aryloxyaryl, alkoxyaryl and heterocyclic, which is stable in alkali and is free from groups reactive with either sulfonyl chloride groups or hydrazine. The radical, R, should contain at least four carbon atoms for each sulfonyl chloride group and for any nitro group present and is also preferably free from functioning groups.

The objectionable groups reactive with hydrazine are those which are acidic or form acidic groups in water. They are reactive with bases and include carboxyl, acid chloride, and chlorine on an aliphatic carbon.

Groups which are reactive with sulfonyl chloride are hydroxyl and amino groups.

Neutral substituents, such as halogen on an aromatic carbon, ether and thio ether, such as $-R'-O-$ and $-R'-S-$ (where R' is an aryl, hydrocarbon aryl aliphatic, or hydrocarbon aliphatic, and is free and unattached to reactive groups other than $-SO_2Cl$), and aliphatic and aromatic hydrocarbon groups, are not objectionable as substituents in R of the above general formula and may or may not be present, as desired.

Thus, the whole genus of organic sulfonyl compounds will work. This invention does not depend upon any particular organic sulfonyl chloride employed, but is broadly involved with adding strong bases to the hydrazine hydrochloride formed during the reaction to neutralize the hydrochloric acid and to insure the most efficient utilization of hydrazine. The method of the present invention may, for example, be employed to make any of the organic sulfonyl hydrazide blowing agents mentioned in U. S. Patent No. 2,626,933.

Because of cost considerations and availability, some of the preferred sulfonyl chlorides for reaction with hydrazine to produce blowing agents are: benzene sulfonyl chloride, the monochloro to pentachloro benzene sulfonyl chlorides, p,p'-oxybis-(benzene sulfonyl chloride), toluene sulfonyl chloride, naphthalene-2,5-disulfonyl chloride, and the various alkyl sulfonyl chlorides having four or more carbon atoms per sulfonyl chloride group present to provide requisite water-insolubility of the reactant hydrazide.

The base employed in the process of the present invention is preferably highly ionized when in solution so that the hydrazine is released rapidly and efficiently, the yield by said process decreasing substantially when poorly ionized bases such as ammonium hydroxides are employed. The molecules of the preferred bases that are dissolved in water exist principally in the form of ions at temperatures from 20° to 60° centigrade whereas the molecules of less suitable weak bases, such as ammonia, are dissociated or ionized very little at those temperatures. The base employed is preferably sodium hydroxide, though any base, such as potassium hydroxide or the like and various other strong bases may be used.

The strength of a base depends upon the degree of ionization or on the concentration of hydroxyl (—OH) ions. The alkalies and alkaline hydroxides are very strong bases for they are ionized to very nearly the same extent as hydrochloric acid in aqueous solution. Ammonia, on the other hand is a comparatively weak base and cannot be considered a "strong base" as that term is understood in the art and as that term is used in this application. However, advantages of the present invention are also obtained using ammonia.

As is well known in the art, weak bases and other weak electrolytes have an ionization constant which is the equilibrium constant for reversible dissociation of a weak electrolyte. For example, if the weak base AB dissociates into A+ ions and B− ions, then $$K = \frac{(C_A)(C_B)}{(C_{AB})}$$

where K is the ionization constant if the concentration (C) of ions is expressed in gram-ionic weights per liter and the concentration of the ionized molecules, AB, is expressed in gram-moles per liter.

Acids and bases, such as acetic acid and ammonium hydroxide, which have ionization constants, K, of less than $1 \times 10^4$ at 25° centigrade are considered to be weak electrolytes as that term is used in the art. Therefore, ammonium hydroxide, hydroxides of less reactive metals, such as beryllium, zinc and lead, and other weak bases with such ionization constants cannot be considered to be strong bases as that term is understood in the art and as employed in the present specification and claims. Ordinary handbooks do not list any ionization constants for alkali metal hydroxides and other strong bases since these electrolytes are virtually completely ionized when in solution and the ionization constant is so large that it can serve no useful purpose.

It will be understood that the term "base" as used in the specification and the appended claims includes mixtures of suitable bases and that small amounts of weak bases may be used with strong bases in performing the method of this invention. It will also be apparent that mixtures of organic sulfonyl chlorides could be employed without departing from the spirit of the invention.

According to the present invention, an aqueous solution of hydrazine is prepared, for example, by reacting dihydrazine sulfate and sodium hydroxide as disclosed in the aforementioned Sundholm patent, and preferably by employing hydrazine hydrate as hereinafter described. A molal equivalent (an amount sufficient to react with all of the hydrazine) of an organic sulfonyl chloride, $R(-SO_2Cl)_n$, having at least four carbon atoms for each sulfonyl chloride group present, is added to the hydrazine to form the corresponding water-insoluble organic sulfonyl hydrazide, $R(-SO_2NHNH_2)_n$, the sulfonyl chloride groups of the sulfonyl chloride molecules being the only groups which will react with bases, all of the groups of said molecules in addition to sulfonyl chloride groups being unreactive with acids and being unreactive with bases. The reaction is as follows:

(I) $R(-SO_2Cl)_n + 2n(H_2NNH_2) \rightarrow$

where R is an organic radical and n is an integer from 1 to 3, inclusive.

Half of the expensive hydrazine is thus combined with HCl in the hydrazine hydrochloride so that it cannot react with excess sulfonyl chloride to form the desired sulfonyl hydrazide. This combined hydrazine may be released from the hydrazine hydrochloride by adding a base substantially stronger than hydrazine. Such a base may be ammonium hydroxide, but vastly superior results are obtained employing a much stronger base and a base which does not have ammonium groups which are so similar to the hydrazonium groups. The base is preferably a very strong base, such as lithium hydroxide, sodium hydroxide, potassium hydroxide, or other alkali metal hydroxide, so that the hydrazine is released from the hydrazine hydrochloride quickly and efficiently and so that yields approaching 100% may be obtained. Such high yields cannot be obtained with weak bases such as ammonia.

According to the preferred method of the present invention, substantially separate reactions are caused to occur, the reactions occurring over and over again until a maximum yield of the desired sulfonyl hydrazide is obtained, the first reaction freeing the hydrazine from its hydrochloride and neutralizing the hydrochloric acid and the second reaction combining the freed hydrazine with more of the organic sulfonyl chloride, $R(-SO_2Cl)$, to form more of the desired organic sulfonyl hydrazide, $R(-SO_2NHNH_2)$. The two reactions, for example, may be illustrated, using an inorganic base stronger than hydrazine, such as a metal hydroxide (ZOH), as follows:

(a) $H_2NNH_3Cl + ZOH \rightarrow H_2NNH_2 + ZCl + H_2O$
(b) $n(H_2NNH_2) + 1/2R(-SO_2Cl)_n \rightarrow$
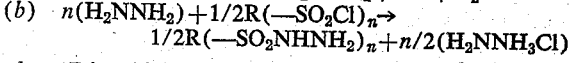

where Z is a highly reactive mono-valent metal.

Each time two molecules of hydrazine which have been freed from hydrazine hydrochloride react with one molecule of the sulfonyl chloride, the amount of the desired organic sulfonyl hydrazide increases by one molecule and only of said two molecules can form hydrazine hydrochloride. The reactions (a and b) can be cause to occur over and over again until all of the sulfonyl chloride and all of the hydrazine have reacted to form the desired organic sulfonyl hydrazide, the reaction (the sum of the reactions after the formation of hydrazine hydrochloride according to Equation I) being represented as follows:

(II) $R(-SO_2Cl)_n + n(H_2NNH_3Cl) + 2n(ZOH) \rightarrow$
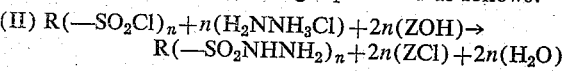

The overall reaction (the sum of the above reactions I and II) is as follows:

(III) $R(-SO_2Cl)_n + n(H_2NNH_2) + n(ZOH) \rightarrow$
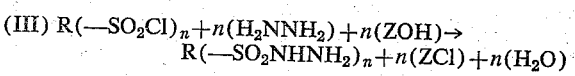

It will be apparent from the above Equation III that good results may be obtained using slight excesses of the hydrazine or the organic sulfnyl chloride. The total amount of base employed is preferably sufficient to render the reaction mixture alkaline at the end of the reaction, but high yields may be obtained if the reaction mixture is not substantially acidic and most of the hydrazine hydrochloride has been eliminated by the end of the reaction.

High yields may, for example, be obtained by adding the required amount of the organic sulfonyl chloride to a dilute aqueous solution of hydrazine, allowing the materials to react for about one hour or until substantially all of the hydrazine has reacted, and then adding very slowly a dilute solution of sodium hydroxide or other alkali metal hydroxide so that the reaction mixture is alkaline at the end of the reaction, the temperature throughout the reaction being maintained at about 20° to 60° C. and sufficiently low to prevent decomposition of the sulfonyl hydrazide, and the base (or mixture of bases) being added slowly to minimize the concentration of hydroxyl (—OH) ions during the reaction of the sulfonyl chloride with the released hydrazine.

Best results are obtained where the contact between molecules of unreacted base and molecules of unreacted sulfonyl chloride is minimized by maintaining the concentration of hydrazine hydrochloride high and/or by adding the base and the sulfonyl chloride separately in increments so that the base reacts with the hydrazine hydrochloride before it has a chance to react with the sulfonyl chloride. Good results may be obtained by adding the base and the last half of the organic sulfonyl chloride slowly after the first half of the chloride has been reacted with all of the hydrazine as in Equation I. The sulfonyl chloride and the base are preferably reacted separately so that the concentration of sulfonyl chloride is low compared to that of the hydrazine hydrochloride where the base is added and so that the concentration of unreacted base is low where the sulfonyl chloride is added. The preferred and most simple method to separate the reactions (a and b) while maintaining a high concentration of hydrazine hydrochloride compared to the concentration of base or the concentration of sulfonyl chloride, is to add the hydroxide or other base and the organic sulfonyl chloride gradually in separate streams to the aqueous liquid containing the hydrazine hydrochloride and the organic sulfonyl hydrazide after substantially all of the hydrazine required for forming the desired amount of final product has been reacted with organic sulfonyl chloride, for example as in Equation I. The two separate streams may be simultaneous and continuous or may be alternating and periodic.

During the initial mixing of hydrazine and organic sulfonyl chloride, during the subsequent additions of base and additional sulfonyl chloride, and throughout the reaction until all of the desired organic sulfonyl hydrazide has been formed, the temperature is preferably limited to prevent hot spots and decomposition of the organic sulfonyl hydrazide blowing agent produced during the reaction. The temperature throughout the reaction is preferably prevented from going above 110° F. or substantially above 40° C. However, advantages of this invention are obtained where the temperature is as high as 50° C. or 60° C. during the reaction particularly when making sulfonyl hydrazide blowing agents which decompose at higher temperatures. In a practical manufacturing process, it is preferable to cool the reaction vessel by means of ice or other suitable refrigerant so that it does not require too much time to add the materials. The rate of addition of the sulfonyl chloride may easily be controlled depending on the rate at which heat is removed from the reaction mixture to keep the temperature below 40° C. and to prevent decomposition. The rate of addition of the base may also be controlled in a similar manner. Keeping the temperature at or below 40° C. is desirable to prevent decomposition, but the temperature limit mentioned represents only an approximate practical limit.

The amount of base added during the reaction is preferably sufficient to react with all of the hydrazine hydrochloride so that the final pH is at least 7. Prior to filtering the pH should be such that the organic sulfonyl hydrazide is insoluble or has minimum solubility. If the final pH is above 9½ after completion of the reaction, HCl is added to reduce the pH so that the yield of sulfonyl hydrazide is not reduced by its being dissolved in a highly basic solution.

The solid product is then separated by filtering, centrifuging or the like, and washed. In the final washing step, any of the wetting or emulsifying agents which are not reactive with acids and are surface active in acids or neutral solutions may be added to the wash water to assist in the removal of the impurities. Such surface-active agents are numerous, and reference to only representative examples of them is feasible. Well-known examples of such compounds are the alkyl aryl sulfonates, such as those sold under the trade names "Santomerse-S" and "Santomerse-D" by Monsanto Chemical Company; the various alkyl aryl sodium sulfonates, such as butyl phenyl sodium disulfonate; non-ionic wetting agents, such as "Advawet 10", a non-ionic purely synthetic organic ether containing no oils, fats, soaps or alcohol sulfates; polyalkylene ether alcohols, such as "Triton N. E."; quaternary ammonium wetting agents, such as cetyl dimethylbenzyl ammonium chloride and the numerous variants of such compounds. Such compounds may also be added just prior to filtering after the pH has been adjusted.

The invention will be more full understood by reference to the following illustrative examples, throughout which "parts" means parts by weight:

*Example I*

| Reaction Mixture | Weight |
| --- | --- |
| Hydrazine Hydrate | 155 parts (3.1 moles). |
| Benzene Sulfonyl Chloride | 548 parts (3.1 moles). |
| Water | 3,300 parts. |
| 50% Sodium Hydroxide | 250 parts (3.12 moles NaOH). |

The hydrazine hydrate and most of the water were first placed into a suitable reactor equipped with cooling means. Half of the benzene sulfonyl chloride was added as quickly as possible while keeping the temperature in the reactor well below 40° C. Then the remaining benzene sulfonyl chloride and the sodium hydroxide with a small amount of additional water were added simultaneously in two separate streams while continuing to keep the temperature from rising above about 40° C. At the end of the reaction, the pH was about 10, and hydrochloric acid, HCl, was added in sufficient amount to lower the pH at least to about 9½, the purpose being merely to insure an acidic or a near acidic condition to decrease the water solubility of the product. Then about 1/16 part of an alkyl aryl sulfonate, "Santomerse-S," was added; the mixture was stirred for about five minutes to emulsify the excess sulfonyl chloride; the mixture was filtered; and the recovered solids were dried to a white crystalline benzene sulfonyl hydrazide powder while keeping the temperature below 60° C. The yield was about 510 parts of benzene sulfonyl hydrazide of high purity, the recovery being about 96% of theory based on the hydrazine hydrate used.

*Example II*

When 655 parts or a molal equivalent (3.1 moles) of monochlorobenzene sulfonyl chloride was substituted for the benzene sulfonyl chloride of Example I, and the same procedure was followed, approximately 600 parts of monochlorobenzene sulfonyl hydrazide of comparable purity were recovered, the yield again approaching 100% of theory based on the hydrazine hydrate used.

*Example III*

When 591 parts or a molal equivalent (3.1 moles) of toluene sulfonyl chloride was substituted for the benzene sulfonyl chloride of Example I and the same procedure was followed, about 550 parts of toluene sulfonyl hydrazide were recovered, the yield again approaching 100% of theory based on the hydrazine hydrate used.

*Example IV*

When molal equivalents (3.1 moles) of pentane sulfonyl chloride and dodecane sulfonyl chloride were respectively substituted for the benzene sulfonyl chloride of Example I in parallel experiments, substantially equivalent yields of the corresponding alkyl sulfonyl hydrazides were obtained.

*Example V*

When one half the number of moles (1.55 moles) of p,p'-oxybis (benzene sulfonyl chloride) or 2,5-naphthalenedisulfonyl chloride was substituted for the equivalent amount (3.1 moles) of benzene sulfonyl chloride in Example I (i. e., 615 parts of p,p'-oxybis-benzenesulfonyl chloride or 547 parts of 2,5-naphthalenedisulfonyl chloride substituted for each 588 parts of benzene sulfonyl chloride), other quantities and conditions remaining the same, substantially equivalent yields of the corresponding oxybis sulfonyl hydrazide and 2,5-naphthalenedisulfonyl hydrazide are obtained.

*Example VI*

The following illustrates a pilot plant size run:

| Material | Pure Material | Purity | Required, lbs. |
| --- | --- | --- | --- |
| Hydrazine Hydrate | 164 lbs. (5.1 mole hydrazine). | 22% | 745 |
| Benzenesulfonyl Chloride. | 900 lbs. (5.1 moles) | 91% | 989 |
| Sodium Hydroxide | 204 lbs. (5.1 moles NaOH). | 50% | 408 |
| Santomerse-D | ⅛ lbs. | 100% | ⅛ |
| Ice | 3,000 lbs. | | |
| Hydrochloric Acid | 30 lbs. | about 36% (concentrated). | |

The hydrazine was weighed into the reactor and cooled to about 58° F. Ice water was circulated through the reactor jacket throughout the reaction. One-half of the benzene sulfonyl chloride, or about 494½ pounds, was added at such a rate that the temperature inside the reactor remained at about 105° F. and not substantially in excess of 40° C. After the initial benzene sulfonyl chloride addition was made, then the following steps were taken at equal rates:

(a) The remainder of the benzene sulfonyl chloride was added.

(b) An aqueous solution of sodium hydroxide containing around 200 pounds of sodium hydroxide as noted in the table above was added to enough water to make 40 gallons of solution. The solution was prepared by weighing out enough of the 50% solution of sodium hydroxide supplied to contain around 200 pounds of sodium hydroxide. Water was added until the total volume of the solution was about 40 gallons.

The rate of this simultaneous addition was adjusted so that the temperature inside did not rise above about 40° C. However, the solutions could have been added as rapidly as permitted by this temperature limitation. Sufficient sodium hydroxide was used so that, after all materials had been added, the pH as indicated by a pH paper was greater than about 9½, although additional sodium hydroxide solution was on hand for addition to insure a pH greater than 9.

The pH of the solution was thereupon adjusted to below about 9½, and preferably below 7, by addition of hydrochloric acid, or other acid capable of reducing pH to about the neutral point.

The mixture having been alkaline during the reaction, ⅛ pound of Santomerse–D was added and the mixture stirred and then filtered. The product, benzene sulfonyl hydrazide, was a solid and this was dried at a temperature not above 140° F. The yield approached 100% of theory based on expensive hydrazine added.

*Example VII*

| Reaction Mixture | Weight |
| --- | --- |
| Hydrazine hydrate | 155 parts (3.1 moles). |
| p,p'-oxybis-(benzenesulfonyl chloride). | 570 parts (1.55 moles). |
| Water | 3,300 parts. |
| 50% potassium hydroxide | 350 parts (3.12 moles KOH). |

The hydrazine hydrate and most of the water are first placed in a suitable reactor equipped with cooling means. Half of the p,p'-oxybis-(benzenesulfonyl chloride) is added as quickly as possible without substantially exceeding a temperature of 40° C., the temperature not exceeding 110° F. at any time. Then the remaining p,p'-oxybis-(benzenesulfonyl chloride) and the 50% potassium hydroxide with a small amount of additional water are added simultaneously in two separate streams so that said sulfonyl chloride and said hydroxide are added gradually and incrementally and are reacted separately, the temperature being prevented from exceeding 110° F. at any time during the reaction. A sufficient amount of potassium hydroxide is added so that the pH at the end of the reaction is about 10. Then, to decrease the water solubility of the product, a sufficient amount of hydrochloric acid is added to obtain a pH of around 5 to 9. Then about ⅟₁₆ part of an alkyl aryl sulfonate, "Santomerse–S," is added; the mixture is stirred for about five minutes to emulsify the excess sulfonyl chloride; the mixture is filtered; and the recovered solids are dried to a white crystalline p,p'-oxybis-(benzenesulfonyl hydrazide) powder while keeping the temperature below 60° C. the yield approaching 100% of theory based on the hydrazine hydrate used.

*Example VIII*

The same quantities of materials are used that are used in Example VII, and the same procedure is followed, except that the 570 parts of p,p'-oxybis-(benzenesulfonyl chloride) is replaced by 505 parts (1.55 moles) of 1,5-naphthalenedisulfonyl chloride, the yield again approaching 100% of theory based on the amount of hydrazine hydrate used.

The procedure employed in the foregoing examples may be varied in several respects without substantial differences in results, as by varying the rate of addition of the organic sulfonyl chloride, by varying the point at which the base is added, by using ice as a source of part of the water as well as a coolant, by varying the amount of alkali or other base and the final pH, by using mixtures of suitable bases, by varying the amount of HCl used prior to filtering, and by using surface-active agents of the class mentioned as substitutes for the "Santomerse–S" or "Santomerse–D." The amount of alkali or other base used during the reaction may be varied to produce a pH of only about 7 or 8 or a pH of about 9½ through 12 or even higher at the end of the reaction. The amount of HCl added just prior to filtration may also be varied to reduce the pH prior to filtration to from about 9½ or higher to about 7 or even 5 or lower.

While I prefer to add the surface-active agent to the reaction mixture after acidification with HCl and before filtration, as a procedural convenience, the acidified reaction mixture may be filtered and the residue washed with an acidic aqueous medium containing the surface-active agent with substantially the same effectiveness. Accordingly, in the appended claims, both procedures are intended to be embraced by expressions such as "filtration in the presence of a surface-active agent" and "washing in the presence of a surface-active agent."

It will be understood that the term "parts," wherever it appears in this application, means parts by weight.

Furthermore, it is to be understood that in accordance with the provisions of the patent statutes, the particular form of product shown and described and the particular procedure set forth are presented for purposes of explanation and illustration and that various modifications of said product and procedure can be made without departing from my invention.

Having described my invention, I claim:

1. In a process of preparing a water-insoluble organic sulfonyl hydrazide by reacting hydrazine and an organic sulfonyl chloride having at least four carbon atoms in an uninterrupted chain for each sulfonyl chloride group present and a degree of hydrophobicity at least as great as a four-carbon-atom alkyl sulfonyl chloride, the sulfonyl chloride groups being the only substituent groups of the molecules of said sulfonyl chloride which will react with bases, the substituent groups of said sulfonyl chloride molecules in addition to sulfonyl chloride being unreactive with acids and unreactive with bases, the steps of adding said sulfonyl chloride portionwise to an aqueous solution of hydrazine until an excess over a molal equivalent has been added, while limiting the temperature to prevent decomposition of said hydrazide, and during the course of said addition and before addition of the last of said sulfonyl chloride, adding a strong base in an amount substantially sufficient to render the reaction mixture alkaline at the end of the reaction, said base being the hydroxide of an alkali metal having an atomic weight less than 40, the amount of said organic sulfonyl chloride present at any time during the addition of each portion of said base being a very small fraction of the amount of said organic sulfonyl chloride added after the initial addition of said base.

2. In a process of producing a water-insoluble organic sulfonyl hydrazide by reacting with hydrazine a water-insoluble organic sulfonyl chloride having at least four carbon atoms in an uninterrupted closed chain for each sulfonyl chloride group present and a degree of hydrophobicity at least as great as a four-carbon-atom alkyl sulfonyl chloride, the sulfonyl chloride groups being the only substituent groups of the molecules of said sulfonyl chloride which will react with bases, the substituent groups of said sulfonyl chloride molecules in addition to sulfonyl chloride being unreactive with acids and unreactive with bases, the steps of preparing an aqueous solution of hydrazine, adding said sulfonyl chloride in increments until an excess over a molal equivalent has been added while keeping the reaction mixture at a temperature less than about 40° C., and during the course of the reaction of the sulfonyl chloride with hydrazine, adding an alkali metal hydroxide which releases hydrazine from hydrazine hydrochloride so that a substantial portion of the hydrazine employed in the reaction is free to react with said sulfonyl chloride, the amount of said hydroxide being sufficient to release hydrazine from most of the hydrazine hydrochloride formed during the reaction and to render the reaction mixture alkaline at the end of the reaction, the alkali metal of said hydroxide having an atomic weight less than 40.

3. In a process of producing a water-insoluble organic sulfonyl hydrazide by reacting hydrazine and an organic sulfonyl chloride having at least four carbon atoms in an uninterrupted chain for each sulfonyl chloride group present and a degree of hydrophobicity at least as great as a four-carbon-atom alkyl sulfonyl chloride, the sulfonyl chloride groups being the only substituent groups of the molecules of said sulfonyl chloride which will react with bases, the substituent groups of said sulfonyl chloride molecules in addition to sulfonyl chloride being unreactive with acids and unreactive with bases, the steps of mixing and reacting with hydrazine in an aqueous solution an amount of said organic sulfonyl chloride sufficient to react with substantially all of said hydrazine, during the mixing adding portionwise a strong base to free hydrazine from the hydrochloric acid formed and to neutralize said acid, adding said sulfonyl chloride portionwise to react with the hydrazine freed by said base, continuing the addition of said sulfonyl chloride and said base until most of the hydrochloric acid formed during the reaction has been neutralized and most of the hydrazine hydrochloride has been eliminated, and limiting the temperature of the reaction mixture and the organic sulfonyl hydrazide therein during the reaction to prevent decomposition of said hydrazide by heat, said base being sodium hydroxide.

4. In a process of producing a water-insoluble organic sulfonyl hydrazide by reacting hydrazine and an organic sulfonyl chloride having at least four carbon atoms in an uninterrupted chain for each sulfonyl chloride group present and a degree of hydrophobicity at least as great as a four-carbon-atom alkyl sulfonyl chloride, the sulfonyl chloride groups being the only substituent groups of the molecules of said sulfonyl chloride which will react with bases, the substituent groups of said sulfonyl chloride molecules in addition to sulfonyl chloride being unreactive with acids and unreactive with bases, the steps of reacting hydrazine and said organic sulfonyl chloride in an aqueous medium to provide a high concentration of hydrazine hydrochloride, adding a strong base to the reaction mixture while the concentration of the unreacted organic sulfonyl chloride is low compared to that of said hydrochloride so as to free hydrazine from said hydrochloride, adding more of said organic sulfonyl chloride portionwise to the reaction mixture after hydrazine has been freed by said base so as to convert the freed hydrazine to the organic sulfonyl hydrazide, continuing the addition of said base and said organic sulfonyl chloride until most of the hydrazine hydrochloride has been eliminated, and limiting the temperature during the reaction to prevent decomposition of said hydrazide, said base being the hydroxide of an alkali metal having an atomic weight less than 40.

5. In a process of producing a water-insoluble organic sulfonyl hydrazide of high purity by reacting hydrazine and an organic sulfonyl chloride having at least four carbon atoms in an uninterrupted chain for each sulfonyl chloride group present and a degree of hydrophobicity at least as great as a four-carbon-atom alkyl sulfonyl chloride, the sulfonyl chloride groups being the only substituent groups of the molecules of said sulfonyl chloride which will react with bases, the substituent groups of said sulfonyl chloride molecules in addition to sulfonyl chloride being unreactive with acids and unreactive with bases, the steps of reacting with hydrazine in an aqueous solution an amount of said organic sulfonyl chloride in excess over a molal equivalent while adding sodium hydroxide slowly and portionwise in an amount sufficient to render the reaction mixture alkaline at the end of the reaction and while maintaining the temperature of the reaction mixture below 40° C., thereafter adding hydrochloric acid to the reaction mixture to reduce the solubility of the organic sulfonyl hydrazide produced, and separating said sulfonyl hydrazide by filtration in the presence of a small amount of a surface-active agent unreactive with acids.

References Cited in the file of this patent
UNITED STATES PATENTS
2,640,853     Sundholm               June 2, 1953